United States Patent
Sarpola et al.

[19]

[11] Patent Number: 6,073,008
[45] Date of Patent: Jun. 6, 2000

[54] SYSTEM FOR ESTABLISHING A REGISTER RECALL DURING AN ACTIVE CALL IN A RADIO SYSTEM PROVIDING A WIRELESS LOCAL LOOP

[75] Inventors: Jussi Sarpola; Vesa Heikkilä; Ari-Pekka Taskila; Hannu Asujamaa; Olli Liinamaa; Pekka Rusi, all of Oulu, Finland

[73] Assignee: Nokia Telecommunications OY, Espoo, Finland

[21] Appl. No.: 08/693,133

[22] PCT Filed: Feb. 23, 1995

[86] PCT No.: PCT/FI95/00098

§ 371 Date: Aug. 13, 1996

§ 102(e) Date: Aug. 13, 1996

[87] PCT Pub. No.: WO95/24103

PCT Pub. Date: Sep. 8, 1995

[51] Int. Cl.[7] .................................................. H04Q 7/26
[52] U.S. Cl. .................. 455/414; 455/554; 455/564; 455/560
[58] Field of Search .................................. 455/517, 524, 455/414, 403, 402, 564, 554, 555, 553, 552, 550, 560, 561, 565

[56] References Cited

U.S. PATENT DOCUMENTS

| 4,866,732 | 9/1989 | Carey et al. .................... 455/555 X |
| 5,235,598 | 8/1993 | Sastua ............................. 370/110.1 |
| 5,493,693 | 2/1996 | Tanaka et al. .................. 455/553 X |

FOREIGN PATENT DOCUMENTS

| 51-103710 | 9/1976 | Japan . |
| 63-167532 | 7/1988 | Japan . |
| 91/07856 | 5/1991 | WIPO . |

Primary Examiner—Wellington Chin
Assistant Examiner—Philip J. Sobutka
Attorney, Agent, or Firm—Pillsbury Madison & Sutro LLP

[57] ABSTRACT

The invention relates to a method for accomplishing a register recall from a subscriber unit of a radio system providing a wireless local loop, the radio system comprising a subscriber network element and base stations to transmit telecommunication signals between the subscriber units and a public switched telephone network. To obtain a register recall in a simple and fast manner, a register recall frame is transmitted from the subscriber unit in a conversion state of the unit to the subscriber network element, a message is awaited from the subscriber network element about receiving the frame, and diallings input from a user interface of the subscriber unit are transmitted on a speech path via the subscriber network unit to the public switched telephone network. The invention also relates to a subscriber unit and a subscriber network element.

7 Claims, 1 Drawing Sheet

SYSTEM FOR ESTABLISHING A REGISTER RECALL DURING AN ACTIVE CALL IN A RADIO SYSTEM PROVIDING A WIRELESS LOCAL LOOP

This application claims benefit of international application PCT/FI95/00098 filed Feb. 23, 1995.

BACKGROUND OF THE INVENTION

Field of the Invention

The invention relates to a method for accomplishing a register recall from a subscriber unit of a radio system providing a wireless local loop (WLL) and further relates to a subscriber network element for transmitting telecommunications signals between the subscriber units and the Public Switched Telephone Network (PSTN), The invention also relates to a WLL system, that is, a radio system providing a wireless local loop, in which system the subscriber units are connected by a radio connection via base stations and a subscriber network element the PSTN.

Subscribers of the WLL system should have access to a register recall and subscriber facilities required thereby in the same way as the subscribers of a normal wired network. Also in the case of a loop dialling telephone, the restrictions for use should also be similar to those for subscribers of a wired network, that is, of the subscriber facilities requiring a recall only trace is operative.

SUMMARY OF THE INVENTION

The object of the present invention is to provide a register recall and subscriber facilities to subscribers of the WLL system. This objective is achieved through the configuration of the WLL system. The WLL system includes a subscriber network element and base stations to transmit telecommunications signal between the subscriber units and the PSTN. In this configuration, the subscriber unit refers to the equipment the subscriber has for transmitting and receiving telecommunications signals. The subscriber unit includes a terminal equipment connected to a user interface. The terminal equipment houses a radio part and a teleadapter. Any conventional type of user interface such as a telephone, a telefax terminal, a computer/modem combination or the like, can be connected to the WLL system by means of the terminal equipment, the radio path thus being invisible to the user. In a conversation state, the subscriber unit transmits a register recall frame to the subscriber network element via the base stations. The subscriber network element is in a standby status waiting to receive the frame and the dialing input. Once the frame and dialing input is received, the subscriber network element transmits the data on a speech path between the subscriber network element and the PSTN;

The invention is based on the idea that the register recall and the facilities can be provided in a simple and fast manner The a recall frame and dialing input are transmitted from a subscriber unit on a speech path, transmitted by a subscriber network element, to the fixed telephone network exchange so that the dialling in connection with the register recall frame can be analyzed at the exchange and the subscriber network element does not need to be able to analyze the dialling. The method of the invention is thus making use of features already existing in fixed telephone network exchanges. The most significant advantage of the method of the invention is that the register recall and the facilities can be provided to subscribers in a simple and reliable way without making any new requirements on the features of the subscriber network element or without raising the price significantly.

The invention also relates to a subscriber unit with which the method of the invention can be applied. The subscriber unit of the invention includes the terminal equipment that contains a means for transmitting a register recall frame to the subscriber network element in response to a recall signal transmitted from the user interface, and a means for transmitting dialing input from the user interface on the speech path to the subscriber network element after receipt of a standby message.

The invention further relates to a subscriber network element with which the method of the invention can be applied and which is suitable to be used in connection with the subscriber unit of the invention. The subscriber network element includes a means responsive to a recall frame transmitted by a subscriber unit.

for transmitting a standby message to the subscriber unit, for identifying the type of the subscriber unit that transmitted the recall frame, for sending a register recall message to the fixed telephone network exchange and for transmitting the diallings received from the subscriber unit on a speech path to the fixed telephone network exchange.

The WLL systems are generally based on a known cellular radio system in which the equipment of the WLL system has been developed by simplifying components of the cellular radio system and by removing features not needed in the WLL system. However, it would be advantageous if the telephones of the cellular radio system could intially be used as subscriber units in the WLL system. Thus the subscriber network element of the invention preferabley comprises means for handling dialing input transmitted also as digit frames For example, the specifications of the NMT-450i system define that dialing input after a register recall frame are transmitted specifically as digit frames.

The preferred embodiments of the method, the subscriber unit and the subscriber network element of the invention are disclosed in the appended dependent claims 2, 4–5 and 7.

BRIEF DESCRIPTION OF THE DRAWINGS

In the following, the invention will be described by means of its first preferred embodiment with reference to the accompanying figures, of which

DETAILED DESCRIPTION OF THE PREFERRED EMBODIMENTS

Figure 1:
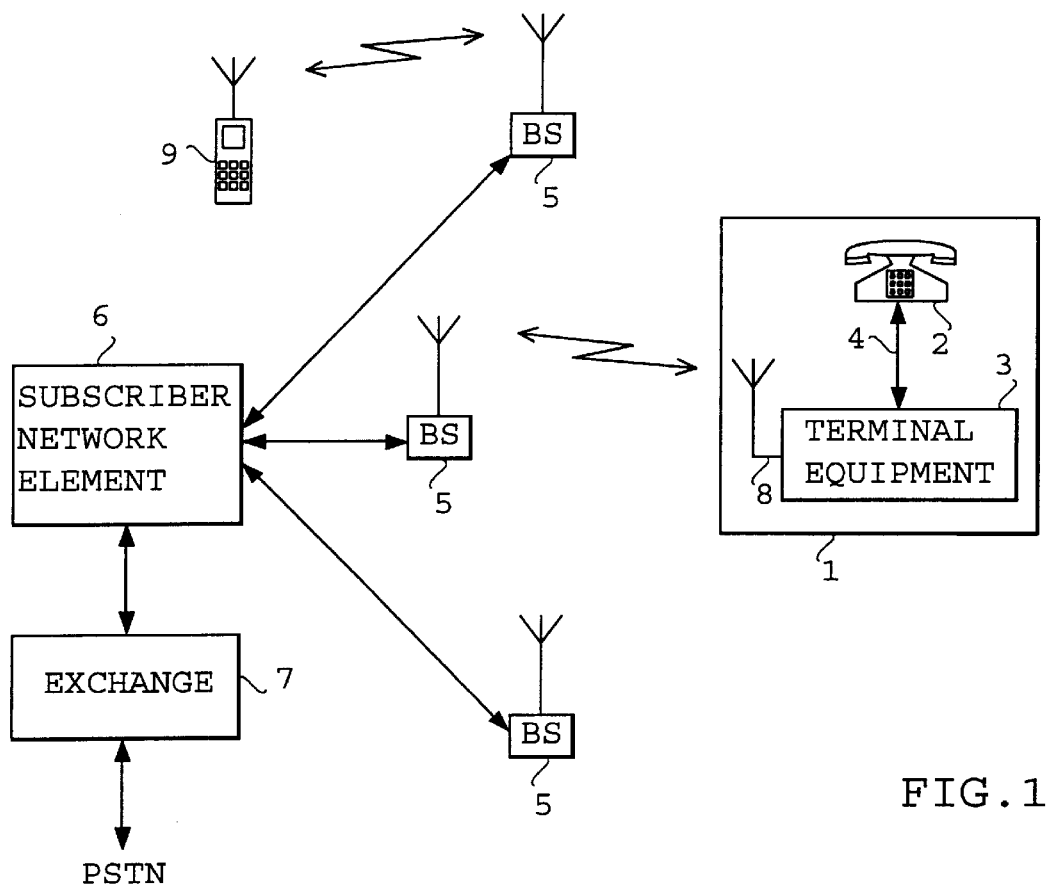
FIG. 1 is a block diagram of a WLL system and FIG. 2 is a partial block diagram of the subscriber network element shown in FIG. 1.

FIG. 1 is a block diagram of a part of a WLL system in which the method of the invention can be applied. The WLL system in FIG. 1 is based on an NMT-450i system that has been simplified by removing unnecessary features. Base stations 5 correspond to parts of the NMT-450i cellular radio system (Nordisk Mobil Telefon). As far as signalling is concerned, a subscriber unit 1 operates almost as a normal subscriber unit of the NMT-450i system. Through the base stations and a subscriber network element 6, calls can also be made with an ordinary mobile phone 9 of the NMT-450i systen, provided that the network operator has programmed the subscriber network element 6 with a view to connecting calls for such a phone. In such a case, said NMT telephone 9 can only be used. However, in the radio coverage area of one base station 5, the subscriber network element shown in the figure does not include handover means with which an ongoing call could be transferred between base stations 5.

The subscriber unit 1 shown in FIG. 1 includes a telephone 2 and a terminal equipment 3. In FIG. 1 the telephone 2 is an ordinary telephone using voice frequency dialing connectable to a fixed telephone network. In FIG. 1 the telephone 2 and the terminal equipment 3 are connected by a two-wire lead 4, through which signals can be transmitted between the terminal equipment and the telephone. The terminal equipment 3 contains signal-processing means for adapting a speech path to a radio channel. Such signal-processing means are, for example, a radio part, consisting of an antenna 8, a radio transmitter and a radio receiver, and a teleadapter that adapts the radio part to an ordinary telephone 2.

The subscriber unit 1 is connected by means of radio frequency signals via the antenna 8 to the base station 5 (the figure shows three base stations), through which calls are transmitted to the subscriber network element 6 and further to the PSTN (Public Switched Telephone Network), that is, to a fixed telephone network exchange 7. The subscriber network element 6 is connected to a local exchange of the fixed telephone network with an open multiplexer connection of CCITT Q.512 V2 type using the 2 Mbit/s PCM system.

When a user of the telephone 2 in a conversation state presses the dial R (or dials 1 in the case of a telephone with loop dialing), the terminal equipment 3 transmits a register recall frame and moves to a so called R state to wait for an acknowledgement utilizing time supervision. In the R state, the terminal equipment will not transmit the received telecommunication signals to the telephone 2. The subscriber network element 6 acknowledges the reception of the recall frame directly by sending a standby message to the subscriber unit 1 via the radio path. Immediately after transmitting the standby message, the subscriber network element sends a message "dialing sufficient" to the subscriber unit whereupon the terminal equipment 3 returns to the conversation state. If the subscriber network element does not send the standby message within a preset period of time, the terminal equipment 3 will return to the conversation state.

Figure 2:
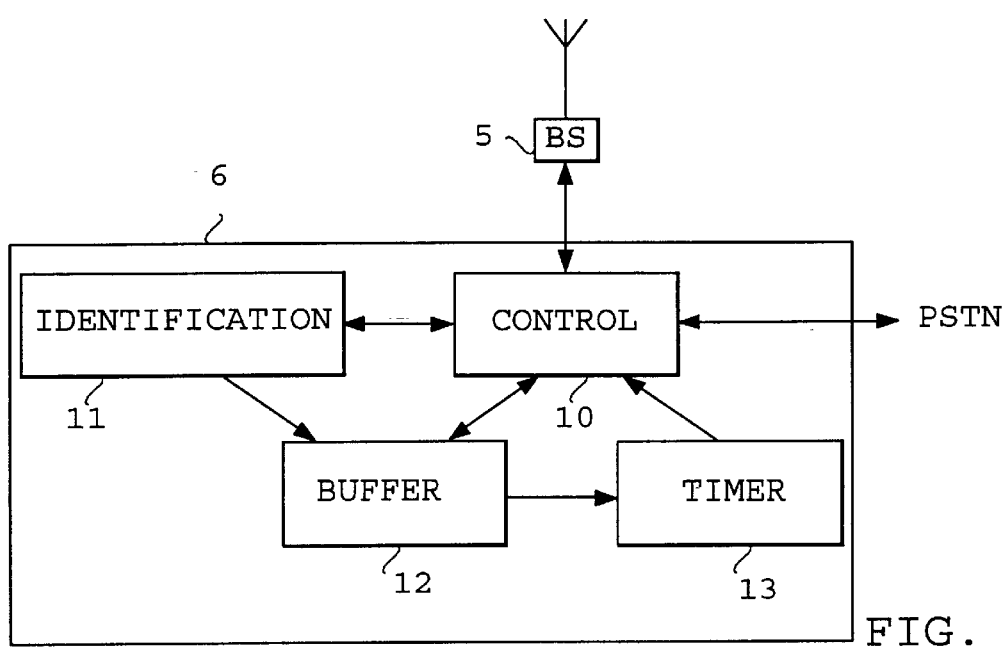

FIG. 2 shows a partial block diagram of the subscriber network element 6 of FIG. 1. Only those components of the subscriber network element that are needed for transmitting a register recall from the subscriber unit 1 or 9 in FIG. 1 are shown in FIG. 2. A register recall frame as defined in the NMT specifications, sent by the subscriber unit 1 or 9 is transmitted from a base station 5 to a control unit 10 of the subscriber network element. The control unit immediately acknowledges the reception of the frame by sending a message via the base station 5 to the subscriber unit. After this, the type of the subscriber unit that transmitted the frame is identified in an identification block 11.

In case the subscriber unit 1 includes an ordinary telephone set and a terminal equipment. The control block 10 transmits a register recall immediately to the PSTN exchange. The exchange will not acknowledge the recall in any way, but will switch on a dialing tone which the subscriber network element transmits directly to the subscriber unit 1. The user of the subscriber unit will hear the dialing tone, after which the user dials the number on the phone. This dialing input is transmitted in voice frequency directly on a speech path via the subscriber network element 6 to the PSTN 5 exchange.

However, if the identification block 11 identifies a mobile telephone of the NMT-450i cellular radio system, the control block 10 starts to receive single digit frames, as defined in the NMT specifications, transmitted from the mobile telephone 9 and forwarded via a base station 5. The control block 10 input the included digit information to a buffer 12. A timer 13 measures the time passed since the previous digit was input to the buffer. When said time measured by the timer 13 exceeds the preset time limit, the control block 10 assumes that the dialing input transmitted from the NMT telephone is received in whole; As defined in the NMT specifications the control block 10 transmits to the mobile phone 9 a message "dialing received" transmit and to the PSTN exchange a register recall and stores the digits in the buffer 12, preferably as a voice frequency dialling.

Consequently, the subscriber network element of the invention can also handle a register recall transmitted by a mobile telephone in the NMT-450i system, even though it does not include means for analyzing the dialing input transmitted from the mobile telephone (by means of which an MTX exchange of the NMT-450i system can for example determine when the dialing input is received in whole).

It is to be understood that the above description and the figures related thereto are only meant to illustrate one preferred embodiment of the invention without restricting the invention itself. Thus the arrangement of the invention can also be used in such WLL systems that are based on some other cellular radio system than the NMT-450i system shown above by way of example. Therefore, the preferred embodiments of the method, the subscriber unit and the subscriber network element of the invention may vary within the scope of the appended claims.

We claim:

1. A method for accomplishing a register recall from a subscriber unit of a radio system providing a wireless local loop, the radio system comprising a subscriber network element and base stations to transmit telecommunication signals between the subscriber units and a public switched telephone network, said method comprising:

establishing a speech path between said subscriber unit and said public switched network via said subscriber network element and one of said base stations;

activating a conversion state for said subscriber unit;

transmitting a register recall frame from said subscriber unit in said conversion state to said subscriber network element;

awaiting a message from said subscriber network element about receiving said register recall frame; and transmitting a dialing input from a user interface of said subscriber unit on said speech path via said subscriber network element to said public switched telephone network.

2. A method as claimed in claim 1, wherein the dialing input from the user interface is a voice frequency dialing input.

3. A subscriber unit of a radio system providing a wireless local loop, the radio system including a subscriber network element, the subscriber unit comprising a terminal equipment and a user interface, wherein the terminal equipment comprises:

means for entering a conversion state, wherein a speech path is established between said user interface and said subscriber network element;

means for transmitting a register recall frame to said subscriber network element during said conversion state in response to a recall signal transmitted from said the user interface; and means for transmitting a dialing input from said user interface on said speech path to said subscriber network element after receipt of a standby message.

4. A subscriber unit as claimed in claim 2 or 3, wherein the user interface is a voice frequency dialing telephone in which the recall signal is created by pressing a R dial in the conversation state of the subscriber unit.

5. A subscriber unit as claimed in claim 2 or 3, wherein the user interface is a loop dialing telephone in which the recall signal is created by dialing in the conversation state of the subscriber unit.

6. A subscriber network element of a radio system providing a wireless local loop, the subscriber network element having a data transfer connection with a telephone exchange and comprising:

- means for establishing, via base stations, a radio connection to a subscriber unit located in the coverage area of base stations, for establishing a speech path between said subscriber unit and said exchange and for transmitting telecommunication signals between said subscriber unit and said exchange on said speech path; and
- means responsive to a recall frame transmitted by said subscriber unit after said speech path is established:
  - for transmitting a standby message to said subscriber units;
  - for identifying the type of said subscriber unit that transmitted said recall frame;
  - for sending a register recall message to said fixed telephone network exchange; and
  - for transmitting said dialing input received from said subscriber unit on said speech path to said telephone exchange.

7. A subscriber network element as claimed in claim 6, wherein the subscriber network element also comprises:

- storage means responsive to an identification means for buffering the dialing input received from said subscriber unit as digit frames;
- timer means responsive to said storage means for measuring time elapsed since reception of a previous frame; and
- means responsive to said timer means for transmitting said buffered dialing input to said telephone exchange and for sending a predetermined message to said subscriber unit when said time elapsed since said reception of said previous frame exceeds a predetermined time limit.

* * * * *